3,518,050
ZIRCONIUM COMPOUNDS
James Louis Woodhead, Didcot, England, assignor to United Kingdom Atomic Energy Authority, London, England
No Drawing. Filed June 5, 1967, Ser. No. 643,348
Claims priority, application Great Britain, June 9, 1966, 25,840/66
Int. Cl. C01g 25/00
U.S. Cl. 23—102     3 Claims

ABSTRACT OF THE DISCLOSURE

The invention discloses a novel zirconium compound wherein the ratio of nitrate to zirconia is about 1.1. This compound is made by reacting zirconium hydroxide or carbonate with nitric acid to provide a water-based sol.

BACKGROUND OF THE INVENTION

The present invention relates to zirconium compounds and more specifically to compounds containing zirconium and nitrate ions.

Two zirconium/nitrate compounds are known, namely zirconium nitrate $Zr(NO_3)_4.5H_2O$, which may actually be $(ZrO).H_2(NO_3)_4.4H_2O$, and a basic nitrate ("zirconyl" nitrate) $ZrO(NO_3)_2.2H_2O$. It will be observed that in these compounds the molar ratio $(NO_3):Zr$ is 4:1 and 2:1 respectively.

SUMMARY OF THE INVENTION

According to the present invention there is provided a new composition of matter comprising a water-based sol comprising zirconium and nitrate ions, wherein the nitrate to zirconium molar ratio is 1.1.

The compound may be prepared as an aqueous solution or sol and also in a solid form by drying such solution or sol, this solid form being re-dispersible in water. Since the liquid form appears to be more in the nature of a sol than a true solution, the term "sol" will be used herein; by analogy the term "gel" is used for the solid form.

The compound appears to contain the known cyclic tetramer $(Zr_4(OH)_8)^{8+}$ present in so-called "zirconyl" compounds. This tetramer is believed to be present in "zirconyl" nitrate of empirical formula $ZrO(NO_3)_2.2H_2O$ for which we have obtained the following infra-red data:

$\delta OH^{(cm.-1)}$: 1101, 1045, 954
$\delta OH^{(cm.-1)}$: 817, 660
$\gamma OH^{(cm.-1)}$: 3200
$\gamma OH^{(cm.-1)}$: 2440, 2215

This information confirms that "zirconyl" nitrate contains no lattice water and covalent nitrato groups and can be formulated as $[Zr_4(OH)_8(NO_3)_8(H_2O)_8]°$.
can be formulated as $[Zr_4(OH)_8(NO_3)_8(H_2O)_8]°$.
can be formulated as $[Zr_4(OH)_8(NO_3)_8(H_2O)_8]°$.

On the other hand, the compound of the present invention contains lattice water and both covalent and ionic nitrate. It would appear to be a large cationic polymer in which the tetrameric units are joined by nitrato and diol bridges. If these are equal in number the compound can be written:

$$[Zr_4(OH)_{12}(NO_3)_2(H_2O)_4]_n(NO_3)_{2n}.2nH_2O$$

The preferred method of preparation of a sol of the compound of the present invention is to prepare a dispersion or slurry of zirconium hydroxide and react this with an approximately equimolar quantity of concentrated nitric acid. The reaction is conveniently carried out at about 50°–70° C. and agitation is desirable. The carbonate may also be used.

It should be observed that commercial zirconium hydroxide and carbonate contain hafnium and the carbonate contains sodium but these elements do not appear to interfere with the preparation of the sol or gel.

An alternative method of preparation is to heat basic zirconium nitrate in air at about 200° C. Provided that the heating is continued for the time necessary to produce a molar ratio $(NO_3):Zr$ of 1.1, the product is completely soluble.

Another method of preparation is to prepare zirconium hydroxide and wash it well with water. It may then be taken up with basic zirconium nitrate provided that the correct quantity of nitrate ion is present.

It must be emphasised again that although the term "sol" is used herein, the product behaves more nearly like a true solution in many of its characteristics. However this depends on the correct molar proportions of $NO_3:Zr$.

The following Table 1 shows the effect on viscosity and other characteristics of altering this ratio.

TABLE 1

| $NO_3/Zr$: | Viscosity (centipoise) |
|---|---|
| 1.03 | 223 |
| 1.04 | 133 |
| 1.06 | 23.2 |
| 1.10 | 18.6 |

With a ratio below about 1.03 it is extremely difficult, if not impossible, to form a sol. However since a viscosity below about 30 cp. is desirable to obtain a useable sol, the permissable departure from the nominal value of 1.1 is desirably not more than −0.05. It will also be apparent that as the ratio increases the excess nitrate is accommodated as conventional zirconyl nitrate. For many purposes this is not a disadvantage except that there is a cost penalty in incorporating the nitrate which must later be removed. Thus, if it is desired to form spheres, as is later described, this is effected by denitration of the sol by an amine to give a ratio of approximately 1.05, gelling taking place extremely rapidly at this ratio. It will be apparent that if excess nitrate is present in the form of zirconyl nitrate, a very considerable excess of amine will be necessary to reduce the ratio to that at which gelling takes place.

Within these limits, however, the sol of the present invention is completely stable even at molarities of 4 and above (the maximum concentration appears to be about 5 molar) and centrifugation gives no separation even when carried out at 3700 r.p.m. for 30 minutes.

Having obtained the sol by one of the routes above described, known stabilisers for zirconia may be added as nitrates without causing precipitation of the sol. Thus a few percent by weight (based on the zirconia content) of calcia or yttria (as calcium nitrate or yttrium nitrate) may be added.

The sol may be converted into the gel by the simple process of drying at about 80–90° C. over a period of a few days to give a solid glassy mass which can easily be re-dissolve din water to give the sol.

This gel may be de-nitrated by heating in a suitable calciner at about 500° C. and the product is then conveniently calcined at some higher temperature, in air, to give zirconia. The final calcining temperature should be chosen having in mind the properties, such as surface area, that are required. The sol of the present invention can also be used to plasticise zirconia to permit it to be extruded.

DESCRIPTION OF THE PREFERRED EMBODIMENTS

In order that the present invention may more readily be understood, certain experiments relating to the same will now be described.

Experiment 1

1.47 kg. of commercial zirconium hydroxide paste (supplied by Magnesium Elektron Ltd., Manchester) was taken. About half the zirconium hydroxide was added to 0.40 l. of nitric acid (15.7 m.) in a stainless steel vessel and the remainder was slurried with 0.60 l. of distilled water and the slurry added to the nitric acid, with stirring, over 15 mins. The temperature rapidly reached 70° C. and was held at that value by heating for 1 hour. The zirconium hydroxide used proved on analysis to contain 35.0% by weight of zirconium and halfnium, wherein the molar ratio Hf:Zr is approximately 1:85. This procedure made about 1.85 l. of sol.

The sol was semi-opaque and absorbed ultra-violet light above $250\mu$. The $303\mu$ absorbtion bands due to nitrate ion were distorted indicating the presence of a large and probably complex molecule.

It was apparent that this sol was extremely stable and no tendency to gel was observed. It was also tolerant of added nitrate salts. The addition of nitric acid however destroyed the sol, probably by the formation of basic zirconium nitrate, in approximate dependance upon the quantity of added nitric acid. The tolerance to added nitrate salts may be made use of by the addition of stabilisers for zirconia such as calcia, yttria or like known oxides, provided that the same are added as a solution of the nitrate.

Experiment 2

The above experiment was repeated using zirconium carbonate and the sol produced appeared to be identical.

Experiment 3

Various other sols were prepared, covering a range of concentrations and certain physical properties determined. Table II shows the results.

TABLE II

| Molarity (zirconium) | Conductivity (mho./cm.) | pH |
|---|---|---|
| 0.46 | $3.1 \times 10^{-2}$ | 1.2 |
| 0.90 | $4.8 \times 10^{-2}$ | 0.9 |
| 3.42 | $6.9 \times 10^{-2}$ | 0.4 |

Experiment 4

The sol produced in Experiment 1 was taken and 1 litre was evaporated to dryness in air at 85° C. over a period of 3 to 4 days to give 705 g. of a solid glass-like gel which could be dispersed in water without difficulty to reconstitute the sol. The gel analysed as follows:

Zirconium—43.7 by weight
$(NO_3)$:Zr—1.06 by moles
$(H_2O)$:Zr—2.97 by moles

Physical characteristics of the gel that were determined included:

|  | G./cc. |
|---|---|
| Density | 2.93 |

The gel was subsequently de-nitrated by heating to 500° C. and was then calcined in air at 900° C. to yield 414 g. of an oxide of density 5.26 g./cc. (90.7% theoretical). Calcination of normal zirconium hydroxide gives an oxide of density 2.64 g./cc.

Experiment 5

A further batch of 1 litre of sol from Experiment 1 was taken and was suspended in 3 litres of an inert support liquid, specifically trichloroethane, and then 0.3 litres of a water-insoluble amine was added slowly. The amine used was Primene J.M.T. (a tertiary alkyl primary amine) which dissolved in the support liquid. An irreversable reaction took place between the amine and the nitrate content of the sol partially to denitrate the sol and produce solid spheres which could not be re-dispersed in water .These spheres were calcined in air at 900° C. to yield 0.414 kg. of zirconia spheres.

I claim:
1. A method of making a stable zirconium sol comprising the steps of:
mixing water, a zirconium compound selected from the group consisting of zirconium hydroxide and zirconium carbonate, and an approximately equimolar amount of nitric acid, the molar ratio of nitric acid to zirconium compound being not in excess of 1.1:1; and
heating the mixture at a temperature not in excess of 70° C. for up to one hour to produce said stable zirconium sol, the molar ratio of nitrate to zirconium of said sol being approximately equimolar and not in excess of 1.1:1.
2. The method of claim 1, including the further step of drying the sol at 80–90° C., thereby to produce a water-dispersible gel.
3. The method of claim 1, including the further steps of suspending the sol in an inert organic liquid, and adding an amine which is soluble in said inert liquid, whereby irreversible de-nitration of the sol takes place.

References Cited

UNITED STATES PATENTS

| 2,721,115 | 10/1955 | Schoenlaub | 23—140 |
| 3,245,757 | 4/1966 | Klimaszewski | 23—102 |
| 3,256,204 | 6/1966 | O'Connor | 252—313 X |
| 3,259,585 | 7/1966 | Fitch et al. | 252—313 |
| 3,359,213 | 12/1967 | Clearfield | 252—313 |
| 3,384,687 | 5/1968 | Flack | 23—140 |

OTHER REFERENCES

Mellor: A Comprehensive Treatise on Inorganic and Theoretical Chemistry, vol. 7, Longmans, Greene & Co., N.Y., 1927, pp. 161–62.

OSCAR R. VERTIZ, Primary Examiner

G. O. PETERS, Assistant Examiner

U.S. Cl. X.R.

23—50; 252—317